(No Model.)

L. H. PALMER.
SCREW.

No. 378,614. Patented Feb. 28, 1888.

WITNESSES.
J. M. Dolan.
Fred. B. Dolan.

INVENTOR.
Levi H. Palmer
by his attys
Clarke & Raymond

UNITED STATES PATENT OFFICE.

LEVI H. PALMER, OF GLOVERSVILLE, NEW YORK, ASSIGNOR OF ONE-HALF TO N. J. BROCKWAY, OF SAME PLACE.

SCREW.

SPECIFICATION forming part of Letters Patent No. 378,614, dated February 28, 1888.

Application filed September 24, 1887. Serial No. 250,575. (No model.)

*To all whom it may concern:*

Be it known that I, LEVI H. PALMER, of Gloversville, in the county of Fulton and State of New York, a citizen of the United States, have invented a new and useful Improvement in Screws, of which the following is a full, clear, and exact description, reference being had to the accompanying drawings, forming a part of this specification, in explaining its nature.

The invention relates to a screw having a head tapering outward from its shank and provided with cutting sections or edges of peculiar form, whereby the head is caused to form a countersink for itself by removing the substance of the material to which it is screwed and while it is being turned.

Figure 1:
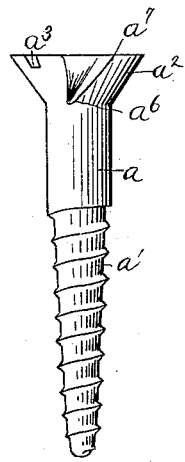
Figure 3:
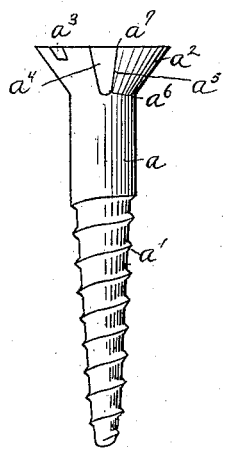
Figure 5:
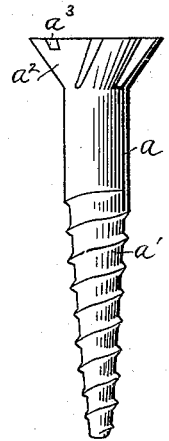
Figure 2:
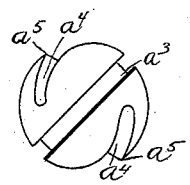
Figure 4:
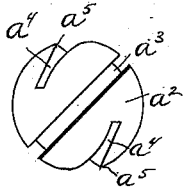
Figure 6:
Figure 7:
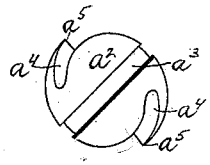

In the drawings, Figure 1 is a view in elevation of a screw having the features of my invention. Fig. 2 is a plan thereof. Fig. 3 is a view in elevation of a screw having a little different form of cutters from that shown in Fig. 1. Fig. 4 is a plan view thereof. Fig. 5 represents in plan, and Fig. 6 in section, a screw having four cutters instead of two. Fig. 7 is a plan view of the head of a screw, illustrating a slightly-modified form of the invention.

Referring to the drawings, $a$ represents the shank of the screw, $a'$ the threaded part thereof, and $a^2$ the head of the screw. The head has the usual cross-recess, $a^3$, for receiving the end of the screw-driver, and there is formed in the head, preferably upon each side of the recess $a^3$, a curved recess, $a^4$, which extends inward from the side edge of the head in a spiral direction, and which may be straight or nearly straight—that is, parallel with the axis of the screw; or they may be somewhat inclined to that axis. In Figs. 1 and 2 I have shown them as inclined, and in Figs. 3 and 4 as very nearly straight. These recesses are enlarged gradually from their inner ends outward, as represented in Figs. 2 and 4, and they form on the screw-head the cutting-edges $a^5$, which extend spirally or substantially spirally upon the conical or tapering side of the head of the screw, and thereby serve to cut the material into which the head is drawn by the screw-thread $a'$ with a shearing cut, and the lower end, $a^6$, of the cutting-edge being in advance of the upper end, $a^7$, and the surface of the recess $a^4$ following this general inclination from its lower edge to the top of the screw-head, it follows that not only do the cutters $a^5$ cut with a shearing cut, but also with a shearing cut that forces in the waste or substance removed from the material upward through the recess $a^4$ as it is cut, so that there is little or no friction upon the head of the screw while it is making its countersink or recess, and the substance of the material removed thereby is moved upward or outward toward the head of the screw. In other words, the cutters are self-clearing. Aside from these desirable features, which arise because of the shape of the recess $a^4$, cutting-teeth of the best form or shape are formed, in that the recess $a^4$, in connection with the outer curve of the head of the screw, provides a long tapering cutting-tool.

If desired, each cutting-edge may be made to extend a little beyond the line of the remainder of the edge of the head by backing off or removing a portion of the side of the head back from the cutting-edge to the recess, as represented in Fig. 7, or by bending the teeth outward a slight distance sufficiently to bring the cutting-edges in line with the sides of the head most distant from its center. I would also call attention to the fact that the cutting-edges and clearing-recesses are arranged in the head of the screw, so as not to weaken it or decrease the length of the screw-driver recess.

In use the screw is turned by a screw-driver in the ordinary way, and when the head reaches the wood or material into which it is screwed, it forms its own countersink by removing the substance of the material, which escapes through the clearing-recesses.

Having thus fully described my invention, I claim and desire to secure by Letters Patent of the United States—

A screw having the screw-thread $a'$, the cylindrical uncut shank $a$, the head $a^2$, having the drive-slot $a^3$, and one or more spiral or inclined cutting edges or teeth, $a^5$, formed by the grooves or tangential recesses $a^4$, arranged in the head in relation to the drive-slot, as indicated, as and for the purposes described.

LEVI H. PALMER.

Witnesses:
W. D. WEST,
F. S. SEXTON.